United States Patent [19]

Cawley et al.

[11] Patent Number: 4,475,948

[45] Date of Patent: Oct. 9, 1984

[54] LITHIUM ALUMINATE/ZIRCONIUM MATERIAL USEFUL IN THE PRODUCTION OF TRITIUM

[75] Inventors: William E. Cawley; Turner J. Trapp, both of Richland, Wash.

[73] Assignee: The United States of America as represented by the Department of Energy, Washington, D.C.

[21] Appl. No.: 488,825

[22] Filed: Apr. 26, 1983

[51] Int. Cl.[3] .............................................. F16N 57/04

[52] U.S. Cl. ...................................... 75/230; 376/146; 376/202; 420/422

[58] Field of Search .................. 75/230; 376/146, 202; 420/422; 501/105

[56] References Cited

U.S. PATENT DOCUMENTS

| | | | |
|---|---|---|---|
| 3,079,317 | 2/1963 | Jenks et al. | 376/202 |
| 3,100,184 | 8/1963 | Abraham | 376/146 |

*Primary Examiner*—Leland A. Sebastian

*Attorney, Agent, or Firm*—Robert Southworth, III; Richard E. Constant; Michael F. Esposito

[57] ABSTRACT

A composition is described useful in the production of tritium in a nuclear reactor. Lithium aluminate particles are dispersed in a matrix of zirconium. Tritium produced by the reactor of neutrons with the lithium are absorbed by the zirconium, thereby decreasing gas pressure within capsules carrying the material.

6 Claims, No Drawings

LITHIUM ALUMINATE/ZIRCONIUM MATERIAL USEFUL IN THE PRODUCTION OF TRITIUM

The United States Government has rights in this invention pursuant to Contract No. DE-AC06-76RL01857 between the U.S. Department of Energy and UNC Nuclear Industries and pursuant to Section 152 of the Atomic Energy Act of 1954.

BACKGROUND OF THE INVENTION

The invention relates generally to the production of tritium in a nuclear reactor and, more particularly to a composition for the production of tritium.

As is well known, tritium may be produced by exposing lithium-6 to the neutron flux in a nuclear reactor. In the past, tritium has been manufactured by placing a zirconium capsule containing $LiAlO_2$ within the nuclear reactor. Because zirconium is readily hydrided, it is necessary to place a protective layer such as aluminum between the $LiAlO_2$ and the zirconium in order to prevent the tritium from destroying the integrity of the capsule.

As the reactor operates, gas pressure from the generated tritium builds up within the capsule until it becomes so great that the capsule must be removed to retrieve the product before capsule failure occurs. In order to remove the capsule, the reactor must be shut down. This premature shutdown disrupts the smooth operation of the reactor, and is particularly uneconomic in the case of dual-purpose reactors which are also used to generate electicity.

In view of the above, it is an object of this invention to provide a material useful in the production of tritium.

It is another object of this invention to increase the time between shut down of a tritium production reactor.

It is a further object of this invention to provide a more economical method for obtaining tritium.

Other objects, advantages, and novel features of the invention will be apparent to those of ordinary skill in the art upon examination of the following detailed description of a preferred embodiment of the invention.

SUMMARY OF THE INVENTION

A composition is provided for the production of tritium in a nuclear reactor comprising lithium aluminate particles imbedded in a zirconium matrix. Tritium produced by the reaction of neutrons with the lithium is absorbed by the zirconium, thereby decreasing gas pressure within capsules carrying the material.

DESCRIPTION OF A PREFERRED EMBODIMENT

According to the invention, a composition suitable for the production of tritium is lithium aluminate particles imbedded in a matrix of zirconium. This composition is to be placed within a metallic capsule and placed within the neutron flux of a nuclear reactor. Lithium-6 upon reaction with a neutron will be transmuted to tritium and helium. These gases will tend to pressurize the metallic capsule to the point that the reactor must be shut down to remove the capsule.

However, with the present invention, the tritium will react with the zirconium matrix forming zirconium hydride. This will tend to result in lower gas pressure in the capsule and thereby increase the time between reactor shutdowns and improve the reactor economics.

A preferred method of preparing the composition of the present invention is to first prepare lithium aluminate powder. This powder may be advantageously prepared using sol-gel techniques so that uniformly sized particles with known properties are achieved. Briefly, aluminium oxide is dissolved in nitric acid to form an aluminum nitrate solution. The aluminum nitrate solution is then reacted with ammonia to return aluminum oxide, now in the form of an alumina sol. At this point, a stoichiometric amount of a soluble lithium compound is added to the solution. Depending upon the neutronic characteristics of the reactor, it may be desirable to use lithium fully enriched in the lithium isotope. The alumina sol-lithium mixture is then added dropwise into a bath of solvent which is at least partially immiscible in the alumina sol. As part of the moisture present in the sol is extracted into the solvent, the sol is converted into perfect spheres of a gel. Through appropriate sizing of the drop-forming means, such as a vibrating nozzle, the resulting particles will be sized between 100 and 500 micrometers. The microspheres may then be heated to drive off remaining moisture and then heated to a high temperature to form the compound lithium aluminate.

Next, finely divided zirconium metal powder may be prepared by first reacting a mass of zirconium with hydrogen to form zirconium hydride, grinding the zirconium hydride to a fine powder in a ball mill, and then dehydriding by heating in a vacuum. The resulting zirconium metal powder will be quite reactive and should be handled either under vacuum or inert conditions.

At this point, the lithium aluminate and zirconium powder are mixed and blended thoroughly. In order that the resulting material or cermet retain the metalurgical properties of the zirconium, it is desireable that the lithium aluminate be less than ten volume percent of the composition. The mixture is then compressed into pellets and is ready for loading into capsules and use in a reactor. The pressing may be done by a number of well know techniques such as cold-pressing, hot-pessing, or sintering. The mixture may either be done to near 100% theoretical density, or some residual porosity may be left to allow room for the helium which will be generated as a co-product.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

We claim:

1. A composition for the generation of tritium upon neutron irradiation comprising lithium aluminate particles imbedded in a zirconium matrix.

2. The composition of claim 1 wherein the lithium aluminate comprises up to 10 volume percent of the composition.

3. The composition of claim 1 wherein the lithium aluminate particles are between 100 and 500 micrometers in diameter.

4. The composition of claim 1 wherein the lithium is enriched in lithium-6.

5. The composition of claim 1 wherein said composition is prepared by:

(a) preparing particles of lithium aluminate with a diameter between 100 and 500 micrometers;

(b) preparing powdered zirconium metal;

(c) mixing the powdered zirconium metal and the lithium aluminate particles; and (d) subjecting the mixture to pressure to form pellets of zirconium/lithium aluminate cermet.

6. The composition of claim 1 wherein said composition is prepared by:

(a) dissolving alumina in nitric acid to form an aluminum nitrate solution;

(b) reacting the aluminum nitrate solution with ammonia to form an alumina sol;

(c) adding a lithium containing solution to the alumina sol;

(d) forming microspheres of a gel by exposing droplets of the mixture of step (c) to an immiscible solvent;

(e) drying the gelled microspheres;

(f) converting the dried microspheres into lithium aluminate particles by sintering;

(g) reacting zirconium metal with hydrogen to form zirconium hydride;

(h) reducing the zirconium hydride to a fine powder;

(i) converting the powdered zirconium hydride to powdered zirconium metal by heating in a vacuum;

(j) mixing the powdered zirconium and the lithium aluminate particles; and (k) subjecting the mixture to pressure to form pellets of zirconium/lithium aluminate cermet.

* * * * *